(12) United States Patent
Bhat et al.

(10) Patent No.: US 9,705,940 B1
(45) Date of Patent: Jul. 11, 2017

(54) SIMULTANEOUS ADVANCED CALL CONTROL FOR BOTH SIMPLE AND ADVANCED SIP USER AGENTS

(75) Inventors: Raghurama Bhat, Cupertino, CA (US); Joel M. Ezell, Broomfield, CO (US); David Shutt, Magor (GB)

(73) Assignee: Avaya Inc., Basking Ridge, NJ (US)

( * ) Notice: Subject to any disclaimer, the term of this patent is extended or adjusted under 35 U.S.C. 154(b) by 2367 days.

(21) Appl. No.: 12/013,283

(22) Filed: Jan. 11, 2008

(51) Int. Cl.
*H04L 12/18* (2006.01)
*H04L 12/16* (2006.01)
*H04L 29/06* (2006.01)

(52) U.S. Cl.
CPC ...... *H04L 65/1096* (2013.01); *H04L 65/1073* (2013.01); *H04L 65/403* (2013.01)

(58) Field of Classification Search
CPC ............ H04L 65/1006; H04L 65/1046; H04L 65/1073; H04L 65/1096; H04L 65/403
See application file for complete search history.

(56) References Cited

U.S. PATENT DOCUMENTS

| | | | | |
|---|---|---|---|---|
| 2002/0061012 A1* | 5/2002 | Thi et al. | | 370/352 |
| 2003/0059028 A1* | 3/2003 | Lee et al. | | 379/265.01 |
| 2003/0145054 A1* | 7/2003 | Dyke | | H04L 29/06 |
| | | | | 709/205 |
| 2004/0160945 A1* | 8/2004 | Dong et al. | | 370/352 |
| 2005/0025146 A1* | 2/2005 | Brown et al. | | 370/389 |
| 2005/0125543 A1* | 6/2005 | Park | | H04L 65/1006 |
| | | | | 709/227 |
| 2005/0174987 A1* | 8/2005 | Raghav | | H04L 29/06027 |
| | | | | 370/351 |

OTHER PUBLICATIONS

Worley, D.R., "The Five Meanings of the REFER Method", Internet Draft, Pingtel, Jun. 18, 2006, pp. 10.
Sparks.R, "The Session Initiation Protocol (SIP) Refer Method", dynamicsoft Apr. 2003, pp. 22.

* cited by examiner

*Primary Examiner* — Parth Patel
*Assistant Examiner* — Jason Harley
(74) *Attorney, Agent, or Firm* — Sheridan Ross P.C.

(57) ABSTRACT

Methods, devices, and systems for creating a call abstraction to enable an application to monitor and control various types of User Agents (UAs) are provided. The application may be adapted to monitor and control simple UAs that do not recognize out of dialog (OOD)-REFER signals as well as advanced UAs that do recognize and can respond to OOD-REFER signals.

21 Claims, 8 Drawing Sheets

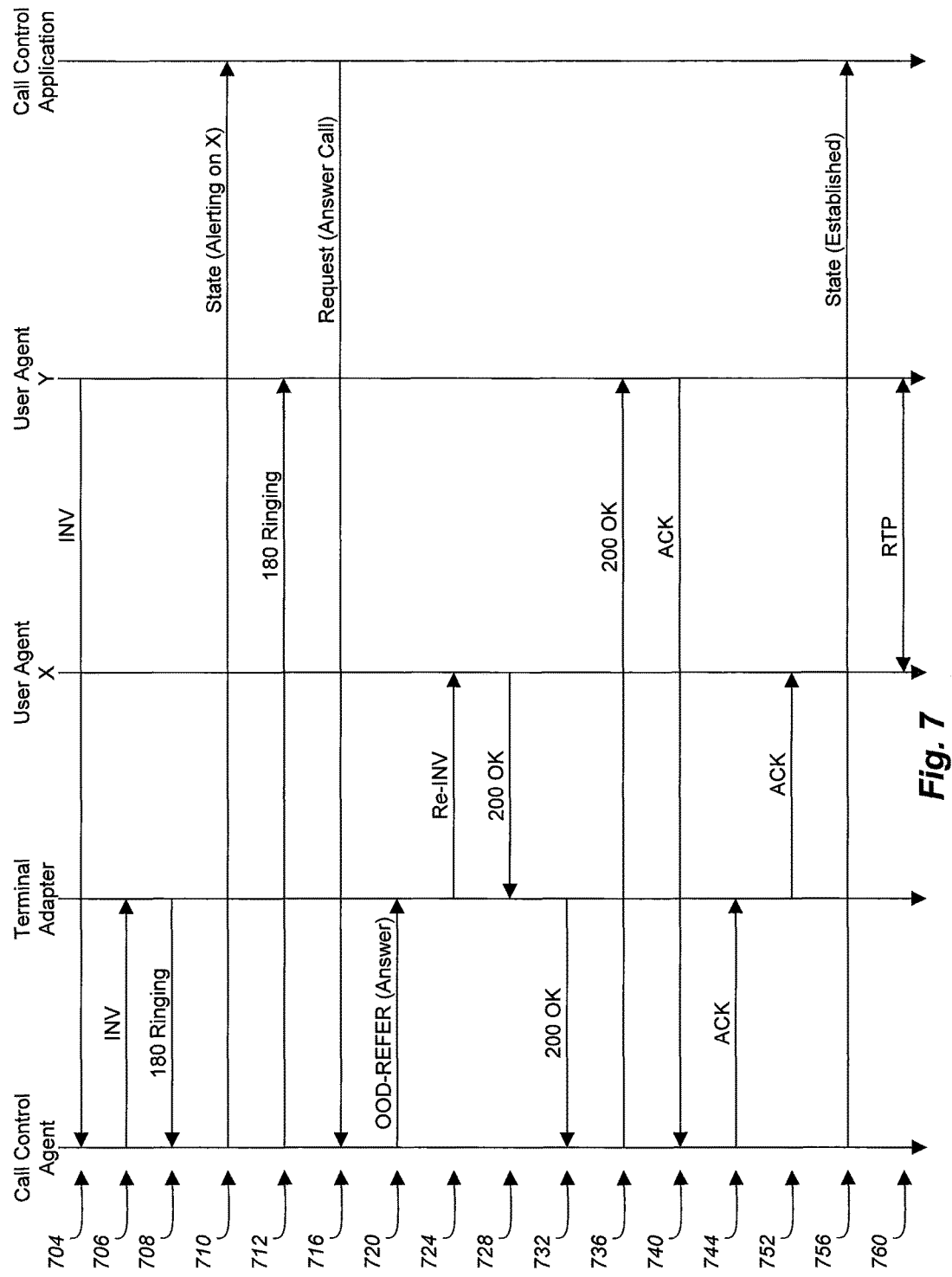

SIMULTANEOUS ADVANCED CALL CONTROL FOR BOTH SIMPLE AND ADVANCED SIP USER AGENTS

FIELD OF THE INVENTION

The invention relates generally to communication systems and methods and more particularly to call control protocols.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant (PDA), cellular phone, IM client, IP phone, traditional telephone, and so on.

One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many SIP application servers exist for the purposes of enabling communications applications in a SIP environment. One of the principle areas for such communications applications is call control of a SIP UA. Many applications require direct manipulation of call states for SIP UAs. Several call control operations easily accomplished in a PBX environment have typically proved troublesome in a SIP Back-to-Back (B2B) UA paradigm. Examples of some operations that are more difficult to implement in a SIP environment than a PBX environment include a "directionally correct" make call, answer call, hold call, and retrieve call.

SUMMARY

There are some suggestions as to how these and other call control operations can be performed by using an out-of-dialog REFER (OOD-REFER) to directly control endpoints with the SIP application server. This presents another problem, though. Namely, very few endpoints support these standards that are still in draft form. UAs that are unable to support the OOD-REFER commands may be referred to as simple UAs.

Accordingly, there exists a need for a SIP application that has the ability to monitor and control both simple UAs (e.g., UAs that are not OOD-REFER capable) and advanced UAs (e.g., UAs that are OOD-REFER capable) using the same application interface.

These and other needs are addressed by various embodiments and configurations of the present invention. The present invention is directed generally to a system, device, and method for enabling an application to monitor and control both simple UAs (e.g., UAs that are not adapted to handle OOD-REFER messages) and advanced UAs (e.g., UAs that are adapted to handle OOD-REFER messages). The method generally comprising:

establishing a service link between a server and a simple User Agent; and enabling the server to cause the simple User Agent to perform Session Initiation Protocol (SIP) functions of an advanced User Agent, wherein the simple User Agent is not capable of performing the SIP functions of the advanced User Agent in the absence of the service link.

The simple UA may be adapted to perform these "advanced UA functions" while maintaining its service link with the server. The service link may be used by a call control application that provides a user of the UA with the ability to remotely control and monitor the UA via his/her desktop, for example.

The REFER method is described by Sparks in IETF RFC 3515 entitled "The Session Initiation Protocol (SIP) REFER Method", the entire contents of which are hereby incorporated herein by this reference. The REFER SIP extension requests that the recipient REFER to a resource provided in the request. A REFER message may be used to enable many different applications, including Call Transfers, Remote Dialing, Third-Party Conference Departures, Remote Hang-ups, and Remotely Induced Responses. Each of these semantically distinct uses of REFER are described in further detail by Worley in an IETF document entitled "The Five Meanings of the REFER Method", the entire contents of which are hereby incorporated herein by this reference. Worley also describes additional details related to OOD-REFER messages. This particular draft contains a subset of the calling operations described above. Additional operations that may be supported by advanced UAs through the use of OOD-REFER message includes, but are not limited to, Remote Make Call, Remote Answer Call, Remote Hold Call, Remote Hang-up, Remote Retrieve/Unhold Call, Conference Calls (e.g., merge two dialogs), Blind Transfer (e.g., transfer call to endpoint/user), Consult Transfer (e.g., transfer dialog X to dialog Y), Remote Divert (e.g., divert unanswered call to another endpoint), and Remote Pickup Call. Although OOD-REFER is a useful tool in providing the above-listed features to an advanced UA, simple UAs such as plain old telephones, a terminal adapter on a Plain Old Telephone Service (POTS), a softphone, or any other non-SIP enabled phone is unable to properly process the OOD-REFER messages, thereby reducing the message's overall usefulness. It is therefore one aspect of the present invention to provide an application and user interface that can monitor and control both simple UAs and advances UAs without restricting another endpoint's use of OOD-REFER messages.

Simple UAs are generally any type of single-line communication device. In other words, the simple UAs are only adapted to be in connection with one entity at a time and do not have multiple lines that would allow the UA to establish a second call while connected to a first entity. Advanced UAs, on the hand, may include multi-line SIP enabled communication devices that can maintain a connection with one endpoint, such as an application remotely controlling the UA, while establishing another connection with another endpoint, such as a calling UA. This multi-line capability of advanced UAs is what allows them to, among other things, process OOD-REFER messages while maintaining a connection with the respective call control application. Advanced UAs have both multi-line and OOD-REFER capabilities. The multi-line capability of a set allows a user to have two simultaneous dialogs to their set at any time (e.g., where one is active and one is held). The OOD-REFER capabilities of sets allows a user to transfer, answer, and make calls remotely. Those skilled in the art will appreciate that embodiments of the present invention allow an application to control a simple set the same as an advanced set in both of these regards.

In accordance with at least one embodiment of the present invention a SIP application server may employ a call monitoring/control interface that shields higher-level applications from having to know or care whether the controlled UA are OOD-REFER capable. The higher-level application would invoke the same call and answer operations regardless of the type of controlled UA. If the UA is simple and therefore in a single dialog mode, a predetermined sequence of messages include a Re-INVITE message may be used as a proxy to the OOD-REFER message that would normally be used.

In accordance with another embodiment of the present invention, a terminal adapter may be employed to make the single dialog or "legacy" UA appear to the rest of the applications and network as an advanced UA which is multi-line and OOD-REFER capable. Upon receiving OOD-REFER messages, the terminal adapter would invoke the same predetermined sequence of messages including the Re-INVITE message to enable the simple UA to perform advanced UA functions. There are two primary advantages to this terminal adapter embodiment. A first is that this embodiment will work well in a sequenced environment where there may be several application servers that have to see an INVITE going from one UA to another. The second advantage is that the terminal adapter may respond to OOD-REFER messages issued by any application server (rather than just one).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 7 is a call flow diagram depicting a call signaling sequence used to receive a call with a simple UA via a call control application and terminal adapter in accordance with embodiments of the present invention.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to monitor and control calls with an external application.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1A:
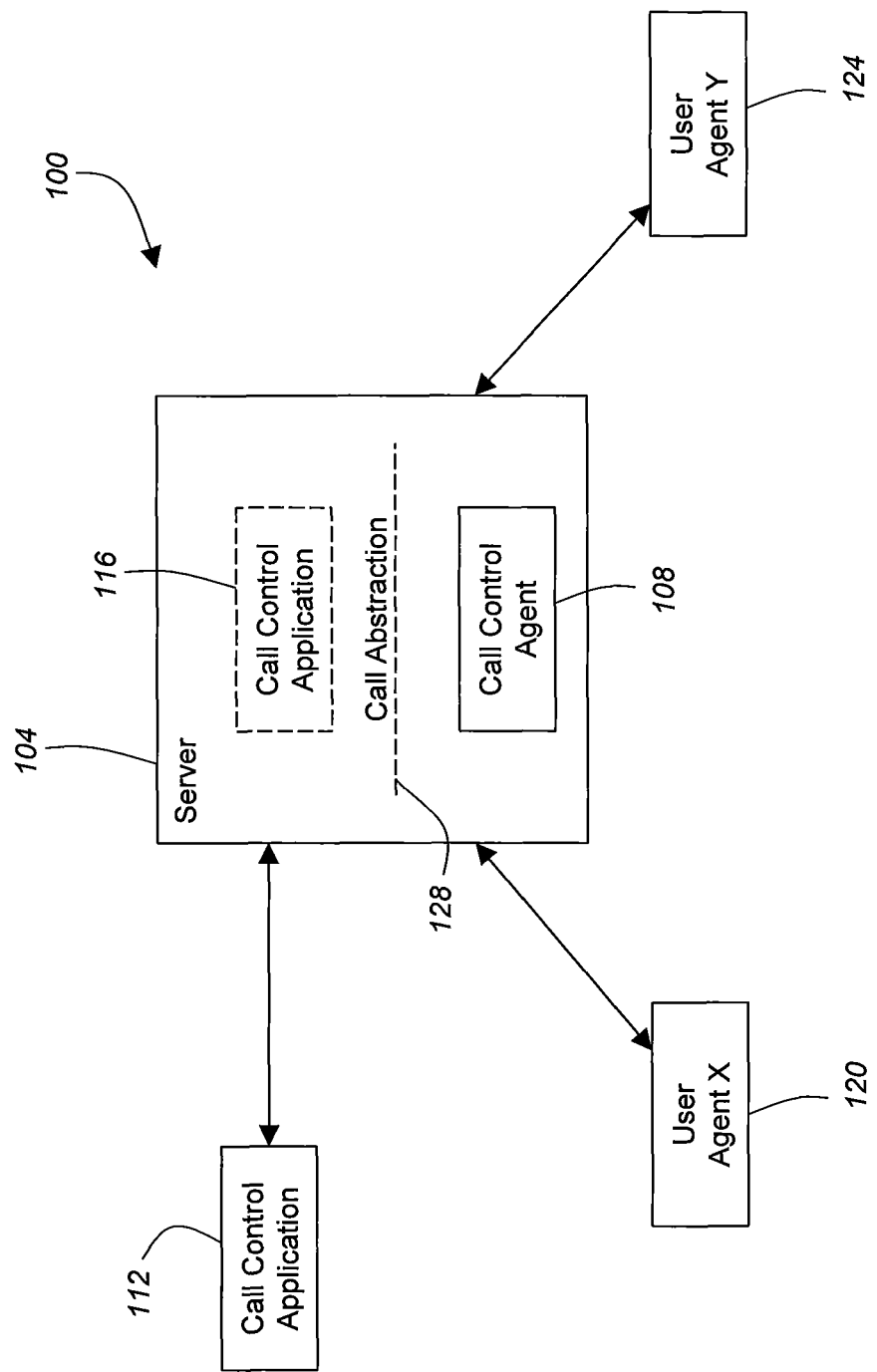
FIG. 1A depicts a communication system in accordance with embodiments of the present invention.

FIG. 1A shows a communication system 100 in accordance with at least some embodiments of the present invention. The communication system 100 may comprise a server 104 that enables communications applications, such as SIP applications, to User Agent X ($UA_X$) 120 and User Agent Y ($UA_Y$) 124. The UAs 120, 124 may include any type of known communication equipment such as a phone (Analog or Digital), a SIP enabled phone, a personal computer, a laptop, a portable electronic mail retrieval device, or the like. The UAs may be advanced UAs, in which case they are able to handle OOD-REFER messages and other advanced SIP commands. The UAs may alternatively be simple UAs, in which case they are unable to recognize and process OOD-REFER messages and other advanced SIP commands. The server 104 may be adapted to help establish a point-to-point communication session between the UAs 120, 124 using various SIP messages regardless of whether the UA being controlled by the server (e.g., $UA_X$ 120) is simple or advanced. To accomplish this particular function, the server 104 may comprise a call control agent 108 that is operable to enable the communication applications related to call control of the UAs.

In addition to providing call control functionality, the server 104 may also include VoIP software, video call software, voice messaging software, recording software, an IP voice server, a fax server, a web server, an email server, and the like.

In accordance with embodiments of the present invention, the server 104 can include interfaces for various other protocols such as a Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

The server 104 may also include a PBX, an ACD, an enterprise switch, or other type of communications system switch or server, as well as other types of processor-based communication control devices such as media servers, computers, adjuncts, etc.

The call control agent 108 operates in connection with a call control application 112, 116 to allow a user to control and monitor the operations of his/her UA (e.g., $UA_X$ 120) remotely. The call control application 112 may reside on a personal computer, laptop, PDA, or the like. The user associated with $UA_X$ 120 may utilize an interface on their personal computer, where the call control application 112 is stored, to control various aspects of the $UA_X$ 120. For example, the user may request to make a call via the call control application 112. Upon receiving such a request, the call control application 112 may send a control signal to the $UA_X$ 120 to send the requested call. The call control application 112 may also allow the user to request to answer calls directed toward $UA_X$ 120.

One example of a call control application 112, 116 is a portal application that can use the call control agent 108 to control/monitor SIP UAs. Another example of a call control application 112, 116 might be an event-driven conferencing service that would automatically include participants in a conference when they called into a particular conference number. Other examples of a call control application 112, 116 will be readily apparent to those skilled in the art after reading this disclosure.

As an alternative to storing a local copy of the call control application 112, a centrally located call control application 116 may be provided on the server 104. This optional type of remote application may include a web-based application or some other application that requires the user to sign in to the call control application 116 via a remote connection, such as an Internet connection. While logged in to the remote call control application 116, the user's personal computer may be provided with the same features, functionality, and interface as if the user were employing the local call control application 112.

A remote call control application 116 may be shared among a number of different users in an enterprise to control their respective UAs, whereas locally stored call control applications 112 are generally utilized on a per user basis. More specifically, an enterprise may comprise a number of local call control applications 112, each stored on a processing platform associated with a particular user that will be ultimately controlling their UA via the local call control application 112. In such an embodiment, a separate local call control application 112 may be used by each user since one user does not normally have access to applications stored on another user's processing platform. In the remote call control application 116 embodiment the enterprise may only be required to store a single copy of the application on a centrally accessible location, such as an enterprise server or the like.

In accordance with at least some embodiments of the present invention, the call control agent 108 provides the call control application 112, 116 with a call abstraction 128 that enables the user to employ the call control application 112, 116 to monitor and control the $UA_X$ 120, regardless of whether the $UA_X$ 120 is a simple UA or an advanced UA. The server 104 may be operable to expose a high-level call monitoring and control interface such as Computer-Supported Telecommunications Applications (CSTA), Parlay, or Call Control eXtensible Markup Language (CCXML). This interface would shield the higher-level application (i.e., the call control application 112, 116) from having to know or care whether the controlled UA (e.g., $UA_X$ 120) is OOD-REFER capable. The server 104 may employ the call control agent 108 to invoke a set of universal instructions regardless of whether the UA is a simple UA or an advanced UA. This may allow the server 104 to provide simple UAs with the ability to perform functions that advanced UAs are capable of performing via the OOD-REFER messages (e.g., hands-free or Remote Answer Call, Remote Make Call, Transfer, Third-Party Conference Departure, and other Remotely Induced Responses). When controlling an advanced UA, on the other hand, the server 104 only needs to implement the OOD-REFER messages according to their prescribed operations.

The universal operations may be executed using a single dialog mode (also referred to as a permanent service link) to enable the advanced operations for a simple UA that is not OOD-REFER capable. The single dialog mode relates to an established communication link between the call control agent 108 and the controlled UA. The permanent service link is established between a simple UA and the call control agent 108, so that the call control application 112, 116 doesn't have to know or care, during operation, whether the controlled UA is simple or advanced. The call control agent 108 presents information to the call control application 112, 116 in the same way regardless of the capabilities of the controlled UA and handles all of the call processing semantics for the call control application 112, 116. If the controlled UA is simple, then the single dialog mode or permanent service link may be established and a predetermined sequence of messages may be sent/received by the call control agent 108 instructing the UA to perform a particular function. If the controlled UA were instead advanced and capable of handling OOD-REFER messages, then the call control agent 104 would send the OOD-REFER message to the UA instructing it to answer the alerting call, for example, and no single dialog and predetermined sequence of messages would be required.

The call control agent 108 may include a look-up table or the like mapping SIP capabilities to each UA under the control of the call control agent 108. Upon receiving incoming SIP messages, the call control agent 108 may reference the look-up table to determine the SIP capabilities of the target UA. If the target UA is a simple or legacy UA that cannot support the incoming SIP message (e.g., an OOD-REFER message), then the call control agent 108 will initiate the predetermined sequence of messages with the simple target UA to enable the simple UA to act as if it had processed the OOD-REFER message in the normal fashion. On the other hand, if upon referencing the look-up table the call control agent 108 determines that the target UA is an advanced UA that can support the incoming SIP message, then the SIP message is forwarded directly to the target UA.

Figure 1B:
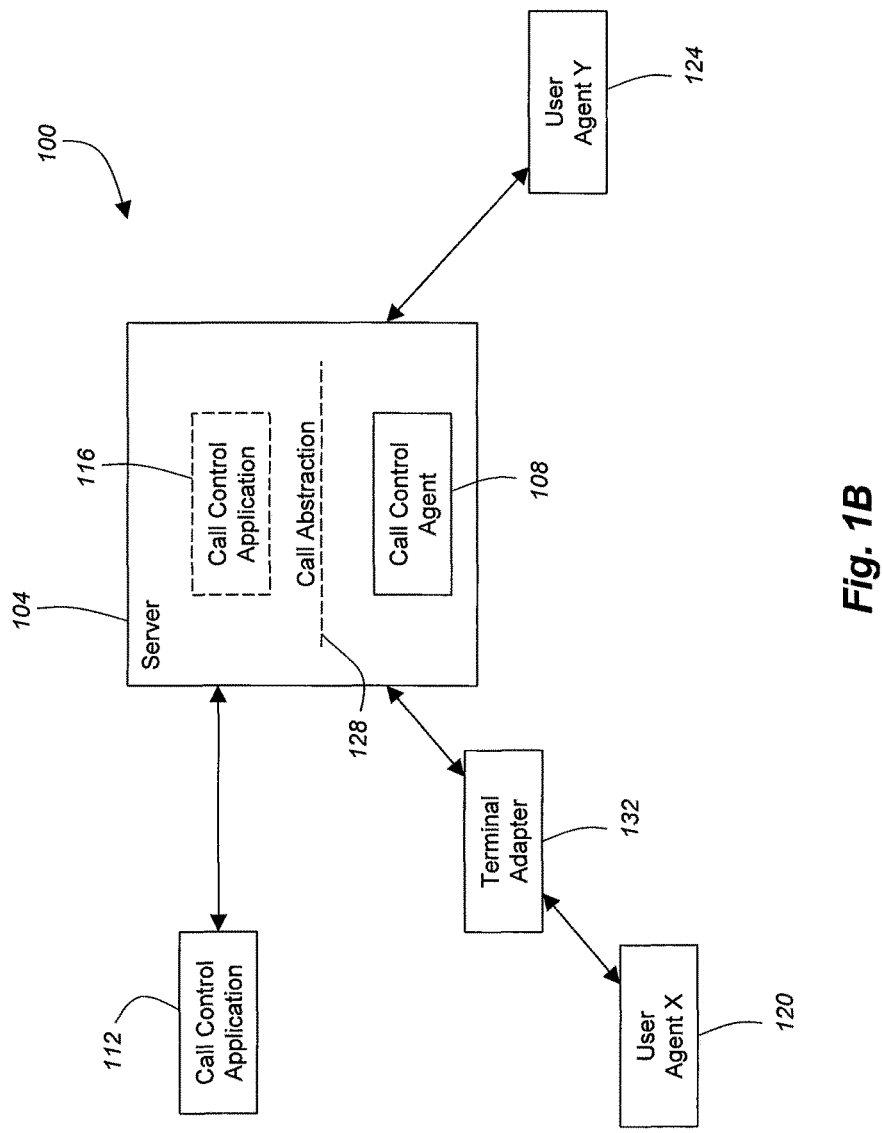
FIG. 1B depicts a communication system with a terminal adapter in accordance with embodiments of the present invention.

FIG. 1B shows a variation of the architecture displayed in FIG. 1A, where a terminal adapter 132 is provided between the controlled UA 120 and the call control agent 108. Although depicted as being external to the server 104, one skilled in the art will appreciate that the terminal adapter 132 may also be internal to the server 104. In accordance with at least some embodiments of the present invention, the server 104 may utilize the terminal adapter 132 to make a single dialog or simple UA appear to the call control application 112, 116 and the rest of the system 100 (e.g., the uncontrolled UAs 124) as an advanced UA which is multi-line and/or OOD-REFER capable advanced UA. Upon receiving an OOD-REFER message instructing the simple UA to answer a call, for example, the terminal adapter 132 would go through a predetermined sequence of messages to cause the UA to begin talking to the caller that sent the OOD-REFER message, without actually forwarding the OOD-REFER message to the simple UA. For instance, upon receiving OOD-REFER messages, the terminal adapter 132 can employ Re-INVITE messages as a proxy to the OOD-REFER message to enable the simple UA 120 to perform advanced UA functions.

In accordance with at least some embodiments of the present invention, a UA connected to the server 104 through the terminal adapter 132 doesn't necessarily need a call control agent 108 performing a call abstraction. Rather, in the call control agent 108 case (i.e., an embodiment without a terminal adapter 132), the normalization of capabilities between the simple and advanced UAs occurs at the call abstraction 128 level. In the terminal adapter 132 case, this normalization occurs at the SIP signaling level. This means that the call control agent 108 based application 112 does not necessarily utilize a call abstraction, but instead works directly at the SIP level to perform similar functions. Of course, certain embodiments of the present invention may utilize both a call control agent 108 and terminal adapter 132 to normalize the capabilities of simple and advanced UAs.

Figure 2:
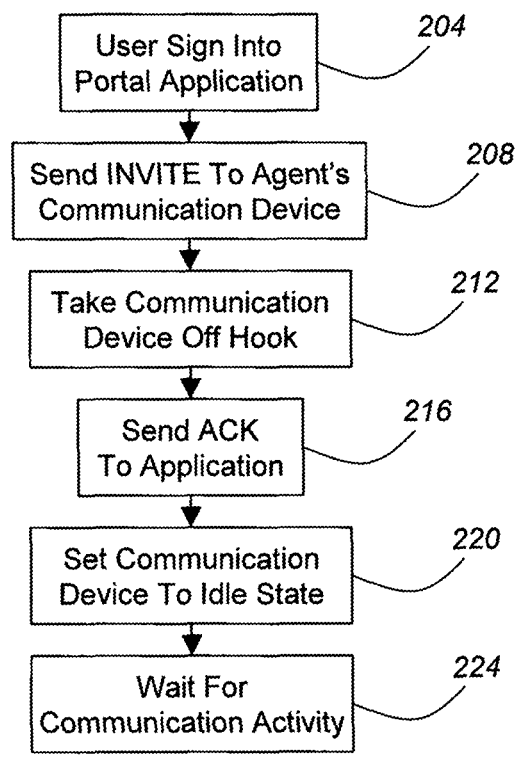
FIG. 2 is a flow diagram depicting a method of initializing a single dialog mode between a UA and a call control application in accordance with embodiments of the present invention.

Referring now to FIG. 2, a method of establishing a service link for a single dialog mode will be described in accordance with at least some embodiments of the present invention. The method begins when a user signs into a call control application 112, 116 (step 204). The user may be required to provide some type of credentials proving to the call control application 112, 116 that they are allowed to access and use the call control application 112, 116. Examples of such credentials may include a password, user name, employee number, and other identifying information.

After the user has successfully signed in, the method continues with the call control application 112, 116 sending an INVITE message to the agent's communication device or UA (step 208). The INVITE message is generally sent to a predetermined UA that is within physical proximity to the station where the user signed in. The INVITE may also be sent to a portable UA (e.g., a cellular phone, PDA, or the like) associated with the user.

The UA will then begin to ring or provide some other indication that the INVITE message has been received. The user may then respond to the INVITE by taking the device off-hook, which results in the UA responding with a 200 OK to the call control application 112, 116 (step 212). When the UA goes off-hook, it transmits an ACK message back to the application 112, 116 to acknowledge receipt and acceptance of the INVITE (step 216).

Upon receiving the ACK message, the call control application 112, 116 and the UA are set to an idle state (step 220). In this idle state a communication session between the UA and call control application 112, 116 is established, the UA is off-hook, but there is no media exchange between the call control application 112, 116 and the UA. In this step, the server 104 may also send a Null SDP to the UA to deactivate the media stream. The UA and call control application 112, 116 then wait for communication activity (step 224). Examples of communication activity include the user remotely requesting (e.g., via the call control application 112, 116) to make a call, the user remotely requesting to receive a call, or the like. In this step an optional "comfort noise" could be provided to the UA while the user is not active on a call. Examples of comfort noise may include background music or white noise. At this point a single dialog mode is established between the application 112, 116 and UA if the UA is a simple UA. It should also be noted that during this idle state, although a dialog exists between the call control agent 108 and the UA, the call state reflect from the call control agent 108 to the call control application is that there are no active calls.

Figure 3:
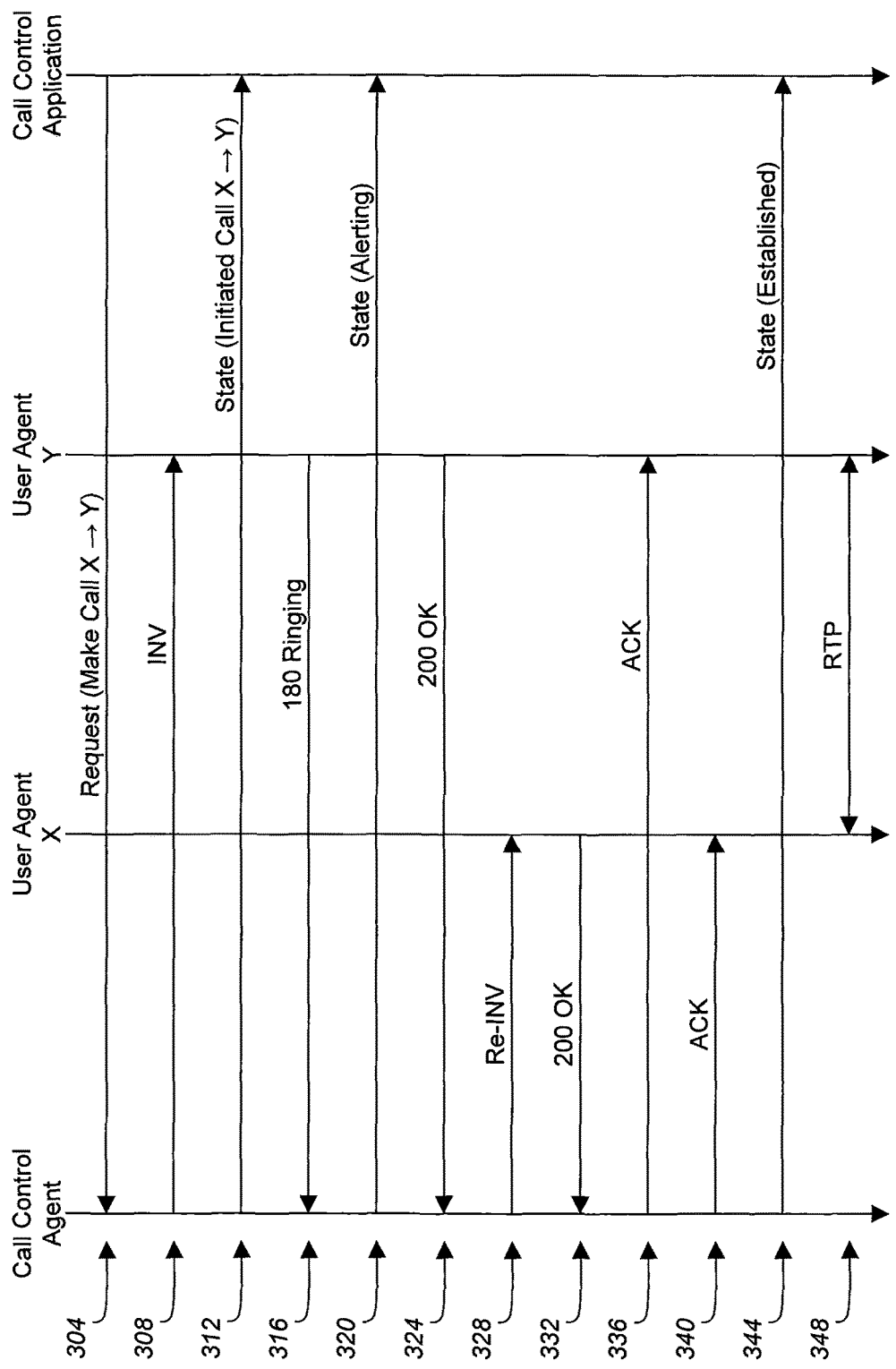
FIG. 3 is a call flow diagram depicting a call signaling sequence used to make a call with a simple UA via a call control application in accordance with embodiments of the present invention.

Referring now to FIG. 3, a method of executing a Remote Make Call operation with a simple UA will be described in accordance with at least some embodiments of the present invention. The dialog between the call control agent 108 and call control application 112, 116 has already been established as was described in FIG. 2, and is not shown here. The call control application 112, 116 and controlled UA are initially in the idle state where no media is exchanged between the two entities. The devices remain in this idle state until a user requests to make a call via their call control application 112, 116. This request is forwarded to the call control agent 108 and the method is initiated (step 304). This prompts the call control agent 108 to send an INVITE message to the uncontrolled UA (e.g., $UA_Y$ 124) (step 308). In this INVITE message no Session Description Protocol (SDP) information for the controlled UA is sent to the uncontrolled UA. Rather, an empty INVITE message is transmitted to the uncontrolled UA asking it to join a call.

The call control agent 108 then sends a state update to the call control application 112, 116 acknowledging that a call is being placed from user X to user Y (step 312). This state update may cause the user interface of the call control application 112, 116 to change its display to indicate that a call will soon be made.

At this point, a logical call abstraction 128 exists between the call control application 112, 116 and call control agent 108, even though the UAs have not yet connected with one another. Rather, the controlled UA is connected to the call control agent 108 (i.e., via the single dialog mode), but the uncontrolled UA is still in the process of connecting with the call control agent 108 (i.e., the call control agent 108 is attempting to contact the uncontrolled UA). This logical call abstraction 128 between the UAs even before the controlled UA is RE-INVITEd from the call control agent 108.

Shortly thereafter, a 180 Ringing message is transmitted from the uncontrolled UA back to the call control agent 108 verifying that the INVITE message has been received (step 316). This 180 Ringing message causes the call control agent 108 to send another state update to the call control application 112, 116 showing that the uncontrolled UA is being alerted (step 320). This is the equivalent of sending a ringing tone to a sending communication device, except the indication on the portal 112, 116 indicates that the call is being sent by the controlled UA.

The call control application 112, 116 and controlled UA will remain in this state until the user associated with the uncontrolled UA either accepts the invitation by taking the uncontrolled UA off hook or until the user associated with the controlled UA abandons the call and hangs up the controlled UA. If the call is accepted by the uncontrolled UA, then the uncontrolled UA sends a 200 OK message back to the call control agent 108 (step 324). Embedded within the 200 OK message is SDP information for $UA_Y$ 124 describing various parameters and preferences of the uncontrolled UA. Those skilled in the art appreciate that SDP is a format for describing streaming media initialization parameters, the details of which have been published by the IETF as RFC 4566. The SDP information may be contained within the body, header, and/or trailer of the SIP messages on which they are transmitted.

SDP is intended for describing multimedia sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats enabling systems based on this technology to be forwards compatible.

The call control agent 108 continues by sending a Re-INVITE message back to the controlled UA (step 328). The Re-INVITE message contains the SDP of $UA_Y$ 124. Receipt of the Re-INVITE message precipitates the controlled UA to send a 200 OK message back to the call control agent 108 (step 332). This particular OK message includes the SDP information for $UA_X$ 120. Upon receiving the OK message from the controlled UA, the call control agent 108 sends ACK messages to both UAs (step 336 and 340). These ACK messages may be transmitted sequentially as is depicted in FIG. 3, or concurrently. As another alternative to the depicted embodiment, an ACK message may be sent to the controlled UA prior to transmission of the ACK message to the uncontrolled UA. The ACK message transmitted to the uncontrolled UA may include the SDP information for $UA_X$ 120. After the ACK messages have been transmitted by the call control agent 108, the call control agent may send a state update to the call control application 112, 116 indicating that a media session has been established between the UAs (step 344). Once each UA has the SDP information for the other UA (i.e., $UA_X$ 120 has SDP information for $UA_Y$ 124 and $UA_Y$ 124 has SDP information for $UA_X$ 120), then a communication session (e.g., a Real-Time Transport Protocol (RTP) communication sessions) may be initiated directly between the UAs (step 348). The server 104 will continue to monitor and provide state information for the controlled UA to the call control application 112, 116 as well as provide the call control application 112, 116 with the ability to remotely operate the controlled UA, but will not be required for the transmission of media between the UAs in their current communication session. Thus, the elusive Remote Make Call function has been provided for the simple UA. The call flow depicted is similar in many respects to an RFC 3725 style Make Call. One significant difference, however, is that the caller doesn't have to answer a ringing phone. Instead, the speakerphone or headset can automatically start relaying RTP to the caller without manual intervention.

Figure 4:
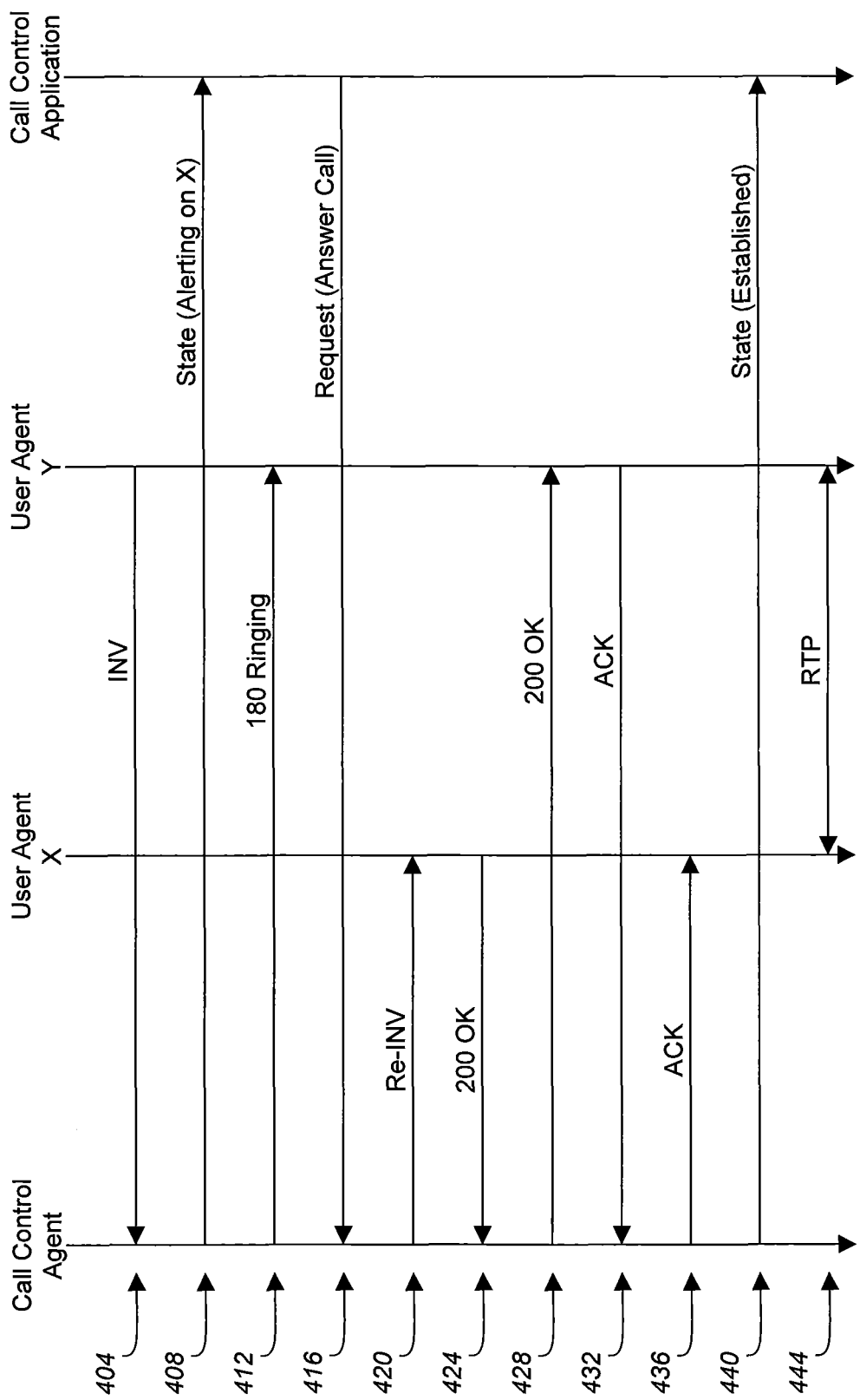
FIG. 4 is a call flow diagram depicting a call signaling sequence used to receive a call with a simple UA via a call control application in accordance with embodiments of the present invention.

With reference to FIG. 4, a method of executing a Remote Answer Call operation with a simple UA will be described in accordance with at least some embodiments of the present invention. The method commences when an uncontrolled UA sends an INVITE message to the call control agent 108 (step 404). The INVITE message is directed toward the controlled UA, but is intercepted by the call control agent 108. The INVITE message may contain the SDP information for the uncontrolled UA. Upon receiving the INVITE message from the uncontrolled UA, the call control agent 108 may reference its look-up table to determine whether the target UA is an advanced UA or whether it is a simple UA. In this particular example, the target UA comprises a simple UA and therefore the call control agent 108 sends a state update to the call control application 112, 116 signifying that a call invitation is being delivered to the target UA (step 408). This state update may cause the user interface of the call control application 112, 116 to indicate to the user that an incoming call is directed toward the controlled UA by flashing lights, sounding an alarm, and/or providing some sort of display type of display. After the state update has been sent to the call control application 112, 116, a 180 Ringing message is transmitted back to the calling UA that causes the calling UA to play a ringback tone until the call is answered (step 412). It should also be noted that the server 104 could set up an "early media" to play ringback to the caller if the caller's phone is not able of generating ringback locally.

A user of the call control application 112, 116 may notice via the user interface that the call status has changed and a call is being directed toward the controlled UA that has a service link established with the server 104. The user may then employ the user interface to send an answer call request via the call control application 112, 116 to the call control agent 108 requesting to answer the call (step 416).

Once the request to answer the call has been received at the call control agent 108 from the call control application 112, 116, a Re-INVITE message is transmitted to the controlled UA (step 420). This Re-INVITE message contains the SDP information previously received in connection with the INVITE message. The controlled UA replies to the Re-INVITE message by sending a 200 OK message back to the call control agent 108 (step 424). The 200 OK message contains the SDP information for the controlled UA. The call control agent 108 then forwards a 200 OK message to the uncontrolled UA thereby providing the uncontrolled UA with the SDP information for the controlled UA (step 428).

When the OK message containing the SDP information for the controlled UA has been sent to the uncontrolled UA, the uncontrolled UA responds by sending an ACK message back to the call control agent 108 (step 432). The call control agent 108 then forwards another ACK message to the controlled UA (step 436). After the ACK has been received by the controlled UA, the call control agent 108 transmits a state update to the call control application 112, 116 signaling that the call set-up has been completed (step 440) and a communication session between the UAs may begin (step 444). The result is that the call control agent 108 has allowed a user of the simple controlled UA to execute a Remote Answer Call operation, a function that only advanced UAs are normally able to execute via an OOD-REFER message.

Although only two operations (i.e., a Remote Make Call and Remote Answer Call) typically only available to UAs capable of processing an OOD-REFER message have been described above, one skilled in the art will appreciate that the service link established between the call control agent 108 and controlled UA may also allow the simple controlled UA to perform other advanced functions such as, for example, Remote Hold Call, Remote Hang-up, Remote Retrieve/Unhold Call, Conference Calls (e.g., merge two dialogs), Blind Transfer (e.g., transfer call to endpoint/user), Consult Transfer (e.g., transfer dialog X to dialog Y), Remote Divert (e.g., divert unanswered call to another endpoint), Remote Pickup Call, and other Remotely Induced Responses. The use of a Re-INVITE message sent over the service link may help facilitate these other operations as it helped facilitate the Remote Make Call and Remote Answer Call.

Figure 5:
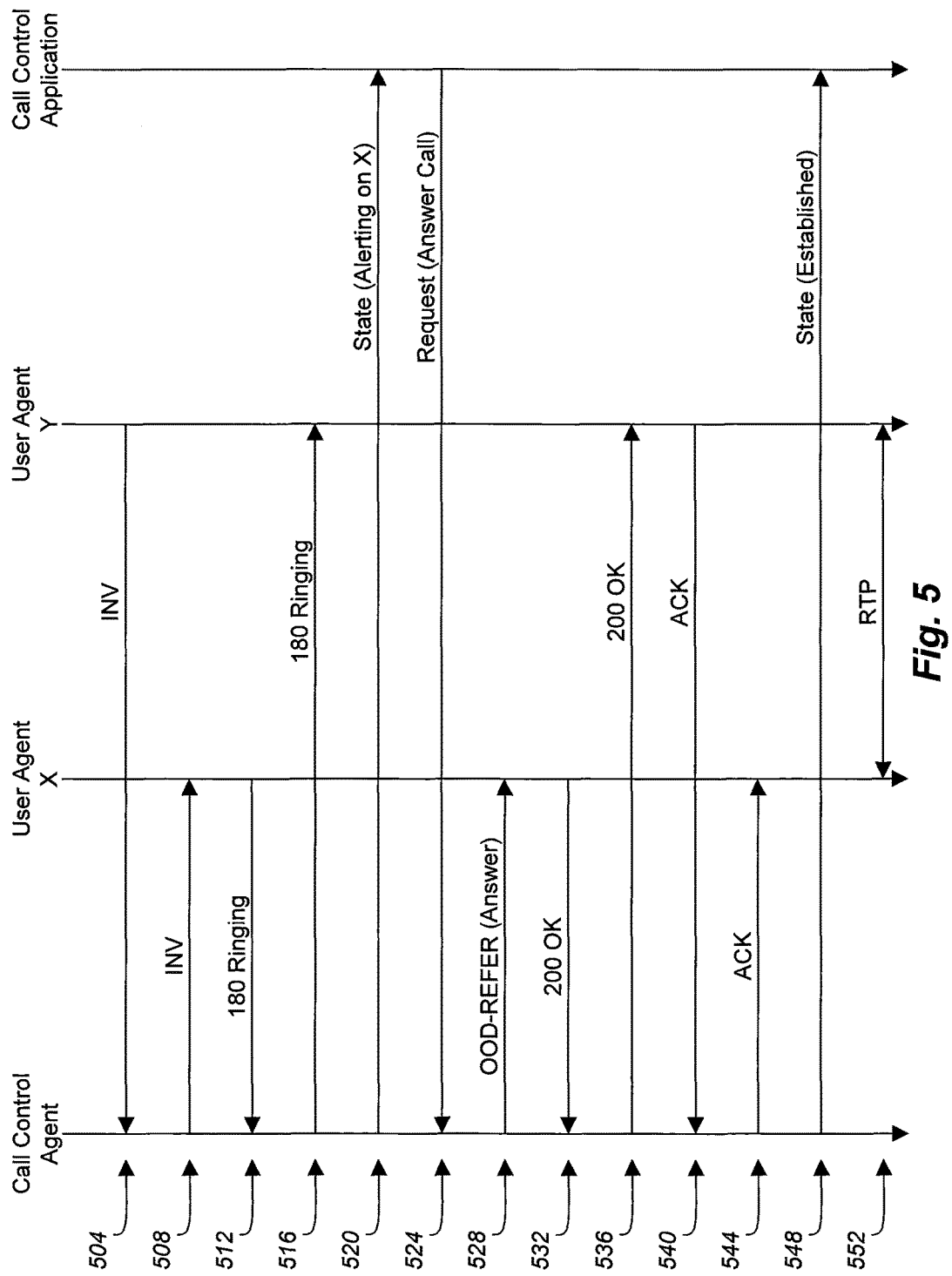
FIG. 5 is a call flow diagram depicting a call signaling sequence used to receive a call with an advanced UA via a call control application in accordance with embodiments of the present invention.

Referring now to FIG. 5, a method of executing a Remote Answer Call operation with an advanced UA when there is no initial dialog between the target UA (e.g., $UA_X$ 120) and the call control agent 108 will be described in accordance with at least some embodiments of the present invention. In this embodiment, the call control agent 108 acts as a back-to-back UA (B2B UA) between the calling endpoint (i.e., $UA_Y$ 124) and the callee endpoint (i.e., $UA_X$ 120). This particular method begins similarly to the method described in connection with FIG. 4, in that the method is initiated when the uncontrolled UA sends an INVITE message to the call control agent 108 providing its SDP information (step 504). Upon receiving the INVITE message the call control agent 108 references a look-up table to determine the capabilities of the target UA. In this particular example, the call control agent 108 determines that the target UA is an advanced UA and can therefore handle OOD-REFER messages. Upon making this determination, the call control agent 108 sends the INVITE to the controlled UA (step 508). Receipt of the INVITE at the controlled UA prompts the controlled UA to reply with a 180 Ringing to the call control agent 108 (step 512), which is subsequently forwarded back to the uncontrolled UA (step 516). The 180 Ringing provides a ringing indication to the calling party showing that the call invitation has been sent and the target UA is alerting its associated user of the incoming call.

After the call control agent 108 has forwarded the 180 Ringing back to the uncontrolled UA, the call control agent 108 sends a state update to the call control application 112, 116 indicating that the target UA is being alerted (step 520). The user is then alerted via the call control application 112, 116 user interface that an incoming call has been received. The user can then respond via the call control application 112, 116 that he/she would like to answer the call. Such a request is sent back to the call control agent 108 (step 524), which causes the call control agent 108 to send the OOD-REFER message to the controlled UA (step 528). The OOD-REFER message initiates the controlled UA to answer the new dialog initiated by the uncontrolled UA. As a response to the OOD-REFER message, the controlled UA sends a 200 OK message back to the call control agent 108 (step 532). This 200 OK message includes the SDP information for the controlled UA. The call control agent 108 then forwards the 200 OK message to the uncontrolled UA, thereby providing the uncontrolled UA with the SDP information of the target UA (step 536).

When the uncontrolled UA receives the necessary SDP information, an ACK message is transmitted by the uncontrolled UA back to the call control agent 108 establishing the parameters for the communication session (step 540). The ACK is then forwarded to the controlled UA such that it too is aware of the communication session parameters (step 544). Once the ACK has been received at the controlled UA, the call control agent 108 sends a state update to the call control application 112, 116 indicating that the call connection has been established (step 548) and the communication session begins between the two UAs (step 552).

Figure 6:
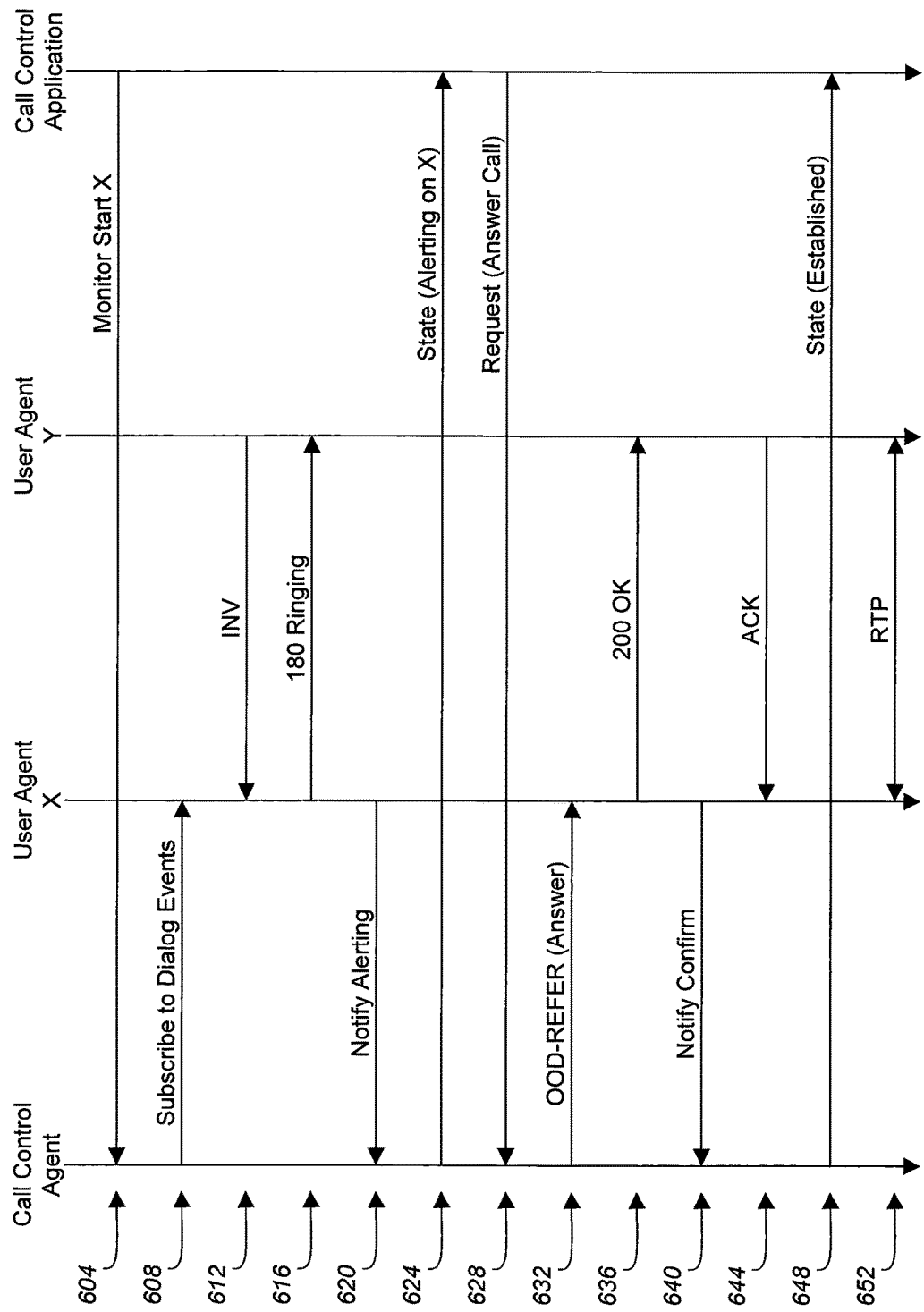
FIG. 6 is a call flow diagram depicting a call signaling sequence used to allow an advanced UA to receive and respond to OOD-REFER messages directly in accordance with embodiments of the present invention.

With reference now to FIG. 6, a method of providing a call control application 112, 116 with a remote dialog control capability of an advanced UA will be described in accordance with at least some embodiments of the present invention. The method begins when a user decides to begin monitoring the operations of a controlled UA via their call control application 112, 116. The user initiates a monitor start routine within the call control application 112, 116, which triggers the call control application 112, 116 to send a monitor start message to the call control agent 108 (step 604). Upon receiving the monitor start message, the call control agent 108 subscribes to the controlled UA and establishes a subscription that can be used to monitor and control the activity of the controlled UA (step 608). The subscription is different from a service link in that the subscription is only directly used to monitor the UAs via the call control application 112, 116, rather than control it. Additionally, there is a response to the subscription, but the user won't manually do anything like go off-hook when the subscription is established. After the call control agent 108 has subscribed to the controlled UA and the controlled UA has recognized this call control (e.g., by going off-hook), the devices wait until call activity occurs.

The method continues when an INVITE message is sent from the uncontrolled UA to the controlled UA (step 612). The INVITE message contains the SDP information associated with the uncontrolled UA. When the INVITE message is received, the controlled UA sends a 180 Ringing message back to the uncontrolled UA confirming that the INVITE has been received (step 616). Receipt of the 180 Ringing message causes the uncontrolled UA to play ringback or provide some other indication to the user that the call is waiting to be answered.

After the controlled UA sends the 180 Ringing message it sends dialog state event to the call control agent 108 indicating that it is being alerted (step 620). The call control agent 108, in turn, sends a state update message to the call control application 112, 116 indicating that a call is being delivered to the controlled UA (step 624). This causes the user interface associated with the call control application 112, 116 to indicate to the user that an incoming call is being received. The user can then engage the call control application 112, 116 to request that the call is answered. Such a request causes an answer call request message to be sent from the call control application 112, 116 to the call control agent 108 requesting the controlled UA to answer the call (step 628).

When the call control agent 108 receives the answer call request from the call control application 112, 116, the call control agent 108 sends an OOD-REFER (Answer) message to the controlled UA (step 632). The OOD-REFER (Answer) message contains instructions for the controlled UA to connect with the calling UA. Accordingly, when the controlled UA receives the OOD-REFER message, the controlled UA sends a 200 OK message to the uncontrolled UA (step 636). The 200 OK message may contain the SDP information for the controlled UA. In addition to sending the 200 OK message, the controlled UA also send a dialog state event to the call control agent 108, indicating that it has sent the 200 OK message (step 640). After the uncontrolled UA receives the 200 OK message, it determines communication session parameters and sends the results of that determination to the controlled UA via an ACK message (step 644). When the controlled UA receives the ACK message, the call control agent 108 sends a state update to the call control application 112, 116 indicating that the connection has been established (step 648) and the UAs are allowed to begin engaging in their RTP communication session (step 652).

With reference to FIG. 7, a method of executing a Remote Answer Call operation with a simple UA and terminal adapter 132 will be described in accordance with at least some embodiments of the present invention. The method commences when an uncontrolled UA sends an INVITE message to the call control agent 108 (step 704), which subsequently forwards the INVITE message to the terminal adapter 132 (step 706). The INVITE message may contain the SDP information for the uncontrolled UA. The INVITE message may have been directed toward the controlled UA, but the call control agent 108 and terminal adapter 132 receive the INVITE message on behalf of the controlled UA. In this case, the call control agent 108 is acting as a sequenced B2BUA in the call flow, so messages from the uncontrolled UA have to first go to the call control agent 108 before being sent on to the terminal adapter 132.

Upon receiving the INVITE message from the uncontrolled UA, the terminal adapter 132 forwards a 180 Ringing message to the call control agent 108 (step 708). Receipt of the 180 Ringing message prompts the call control agent 108 to send a state update to the call control application 112, 116 signifying that a call invitation is being delivered to the target UA (step 710). This state update may cause the user interface of the call control application 112, 116 to indicate to the user that an incoming call is directed toward the controlled UA. After the state update has been sent to the call control application 112, 116, a 180 Ringing message is also transmitted back to the calling UA that causes the calling UA to play ringback until the call is answered (step 712).

A user of the call control application 112, 116 may notice via the user interface that the call status has changed and a call is being directed toward the controlled UA that has a service link established with the server 104. The user may then employ the user interface to send an answer call request via the call control application 112, 116 to the call control agent 108 requesting to answer the call (step 716).

Once the request to answer the call has been received at the call control agent 108 from the call control application 112, 116, the call control agent 108 sends an OOD-REFER message to the controlled UA requesting the controlled UA to answer the call. The primary difference between this embodiment and that described in connection with FIG. 4 is that the call control agent 108 and the server 104 in general do not need a look-up table or any other mechanism to determine whether a controlled UA is simple or advanced. Rather, the terminal adapter 132 is used to convert the OOD-REFER messages before they are transmitted to the controlled UA. This allows the simple UA to be controlled by multiple servers, each of which do not need to identify the UA as simple. The OOD-REFER message is intercepted by the terminal adapter 132 (step 720), which does the conversion for the simple controlled UA. The terminal adapter 132 then transmits a Re-INVITE message to the controlled UA (step 724). This Re-INVITE message contains the SDP information previously received in connection with the INVITE message. The controlled UA replies to the Re-INVITE message by sending a 200 OK message back to the terminal adapter 132 (step 728). The 200 OK message contains the SDP information for the controlled UA. The terminal adapter 132 forwards a 200 OK message to the call control agent 108 (step 732), which then forwards a 200 OK message to the uncontrolled UA thereby providing the uncontrolled UA with the SDP information for the controlled UA (step 736).

When the uncontrolled ACK containing the SDP information for the controlled UA has been sent to the uncontrolled UA, the uncontrolled UA responds by sending an ACK message back to the call control agent 108 (step 740). The call control agent 108 then forwards another ACK message to the controlled UA via the terminal adapter 744 (steps 744 and 752). After the ACK has been received by the controlled UA, the call control agent 108 transmits a state update to the call control application 112, 116 signaling that the call set-up has been completed (step 756) and a communication session between the UAs may begin (step 760). The result is that the call control agent 108 along with the terminal adapter 132 has allowed a user of the simple controlled UA to execute a Remote Answer Call operation without requiring the call control application 112, 116 or call control agent 108 to know that the controlled UA was a simple UA incapable of processing an OOD-REFER message.

Although the preceding methods have been described in connection with a controlled UA (e.g., $UA_X$ 120) and an uncontrolled UA (e.g., $UA_Y$ 124), one skilled in the art will appreciate that both of the UAs may be controlled, either by different servers or the same server. Accordingly, the UAs may be associated with a common enterprise. Alternatively, the UAs may be associated with different enterprises such that each are associated and controlled by different servers. In still other embodiments of the present invention, the uncontrolled UA may comprise a completely uncontrolled UA that does not require the assistance of any particular server.

There are, of course, several other possible variations on the service link model described above. One such variation would employ an "as-needed" service link rather than a permanent service link. In this particular configuration, the dialog to the UA from the call control agent 108 would be established only when the user is active on calls. The user would therefore have to manually pick up the UA for outgoing calls or incoming calls, but all other call control operations would work while the user was active on the call. Another possible variation would support a model somewhere in between an as-needed and permanent service link model by having a configurable timeout where the link would be brought down after X minutes of inactivity on the station providing the user access to the call control application 112, 116.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enabling an application to monitor and control both simple UAs as well as advanced UAs. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   creating a call abstraction between a first User Agent controlled by a call control agent and a second User Agent, wherein the first User Agent and the second User Agent are associated with a first user, wherein the call control agent is located on a server separate from the first and second User Agent; and
   enabling a call control application to one or more of (i) remotely monitor Session Initiation Protocol (SIP) functions and (ii) remotely control SIP functions of the first User Agent via the call control agent on the server.

2. The method of claim 1, wherein the first User Agent comprises a simple User Agent, the method further comprising:
   performing, by the call control agent on behalf of the first User Agent, SIP functions of an advanced User Agent.

3. The method of claim 2, wherein the SIP functions of the advanced User Agent include the ability to respond to and/or recognize Out-Of-Dialog REFER (OOD-REFER) messages, and wherein SIP operations facilitated by the OOD-REFER message include at least one of a SIP based Remote Make Call, a SIP based Remote Answer Call, a SIP based Remote Hold Call, a SIP based Remote Hang-up, a SIP based Remote Retrieve/Unhold Call, a SIP based Conference Calls, a SIP based Blind Transfer, a SIP based Consult Transfer, a SIP based Remote Divert, and a SIP based Remote Pickup Call.

4. The method of claim 1, further comprising:
   receiving user sign-in information for a call control application associated with the call control agent;
   the call control agent sending an INVITE message to the simple User Agent; and
   establishing a service link between the server and the first User Agent when the simple User Agent is taken off-hook.

5. The method of claim 4, further comprising, while the first User Agent is off-hook:
   receiving a request from the call control application to make a call with the first User Agent;
   the call control agent sending an INVITE message to a User Agent identified as a recipient User Agent by the call control application;
   the call control agent receiving a response OK message from the recipient User Agent;

in response to receiving the OK message from the recipient User Agent, the call control agent sending a Re-INVITE message to the first User Agent;

the call control agent receiving a response OK message from the first User Agent;

the call control agent sending ACK messages to the first User Agent and recipient User Agent; and establishing a communication session between the first User Agent and recipient User Agent.

6. The method of claim 4, further comprising, while the first User Agent is off-hook:

the call control agent receiving an INVITE message from a calling User Agent, wherein the INVITE message is directed toward the first User Agent;

the call control agent sending a state update to the call control application indicating that a call has been received;

the call control agent receiving a request message from the call control application directing the call control agent to cause the first User Agent to answer the call;

the call control application sending a Re-INVITE message to the first User Agent;

the call control agent receiving a response OK message from the first User Agent;

the call control agent sending an ACK message to the first User Agent; and establishing a communication session between the first User Agent and calling User Agent.

7. The method of claim 1, further comprising determining whether the first User Agent is capable of performing functions of an advanced User Agent prior to sending an OOD-REFER message to the first User Agent.

8. The method of claim 7, further comprising applying the following logic:

(i) in the event that the first User Agent is determined to be a simple User Agent, sending a Re-INVITE message to the first User Agent; and (ii) in the event that the first User Agent is determined to be an advanced User Agent, sending the OOD-REFER message to the first User Agent.

9. A non-transitory computer readable medium comprising processor executable instructions operable to perform the method of claim 1.

10. A server, comprising:

a processor; and a memory, the memory having processor executable instructions stored thereon, the instructions including a call control agent, that when executed by the processor causes the server to create a call abstraction of a call between an uncontrolled User Agent and a User Agent controlled by the call control agent on the server, wherein the uncontrolled User Agent and the User Agent are associated with a first user, wherein the call abstraction enables a call control application in communication with the server to one or more of (i) remotely monitor Session Initiation Protocol (SIP) functions and (ii) remotely control SIP functions of both simple User Agents and advanced User Agents, wherein the simple and advanced User Agents are separate from the server.

11. The server of claim 10, wherein the call control agent causes the server to send Out-Of-Dialog REFER (OOD-REFER) messages to advanced User Agents and wherein the call control agent causes the server to send Re-INVITE messages as a proxy to OOD-REFER messages to the simple User Agents.

12. The server of claim 10, further comprising a look-up table that lists each User Agent associated with the server and the User Agent's respective capabilities, wherein the call control agent causes the server to reference the look-up table to determine whether a particular User Agent is a simple User Agent or an advanced User Agent prior to determining whether to send the User Agent an OOD-REFER message.

13. The server of claim 10, wherein the advanced User Agents are capable of responding to and/or recognizing Out-Of-Dialog REFER (OOD-REFER) messages that allow the advanced User Agents to perform at least one of a SIP based Remote Make Call, a SIP based Remote Answer Call, a SIP based Remote Hold Call, a SIP based Remote Hang-up, a SIP based Remote Retrieve/Unhold Call, a SIP based Conference Calls, a SIP based Blind Transfer, a SIP based Consult Transfer, a SIP based Remote Divert, and a SIP based Remote Pickup Call.

14. A system, comprising:

at least one of a call control agent on a server and terminal adapter;

at least one User Agent; and a call control application on the server in communication with the at least one User Agent through the at least one of a call control agent and terminal adapter, wherein a user of the at least one User Agent is able to remotely control and/or monitor the SIP functions of the at least one User Agent with the call control application, without the call control application knowing whether the at least one User Agent is a simple User Agent or advanced User Agent, and wherein the at least one User Agent is separate from the server.

15. The system of claim 14, wherein the at least one User Agent comprises an advanced User Agent and a simple User Agent.

16. The system of claim 15, wherein the at least one of a call control agent and terminal adapter comprises a call control agent, and wherein the call control agent is operable to determine whether the User Agent being controlled and/or monitored by the call control application corresponds to the advanced User Agent or the simple User Agent.

17. The system of claim 15, wherein the call control agent sends Out-Of-Dialog REFER (OOD-REFER) messages to the advanced User Agent and wherein the call control agent sends Re-INVITE messages as a proxy to OOD-REFER messages to the simple User Agent.

18. The system of claim 17, wherein the call control agent comprises a look-up table to determine whether a particular User Agent is the simple User Agent or the advanced User Agent prior to determining whether to send the User Agent an OOD-REFER message.

19. The system of claim 15, wherein the at least one of a call control agent and terminal adapter enables the simple User Agent to perform SIP functions of the advanced User Agent.

20. The system of claim 14, wherein the call control application comprises a portal application.

21. The system of claim 14, wherein the at least one of a call control agent and terminal adapter comprises a terminal adapter, and wherein the terminal adapter is operable to create a normalization between capabilities of a simple User Agent and an advanced User Agent at a Session Initiation Protocol (SIP) level.

* * * * *